(No Model.)
J. B. RHODES.
SAW TOOTH SWAGE.
No. 445,339.   Patented Jan. 27, 1891.
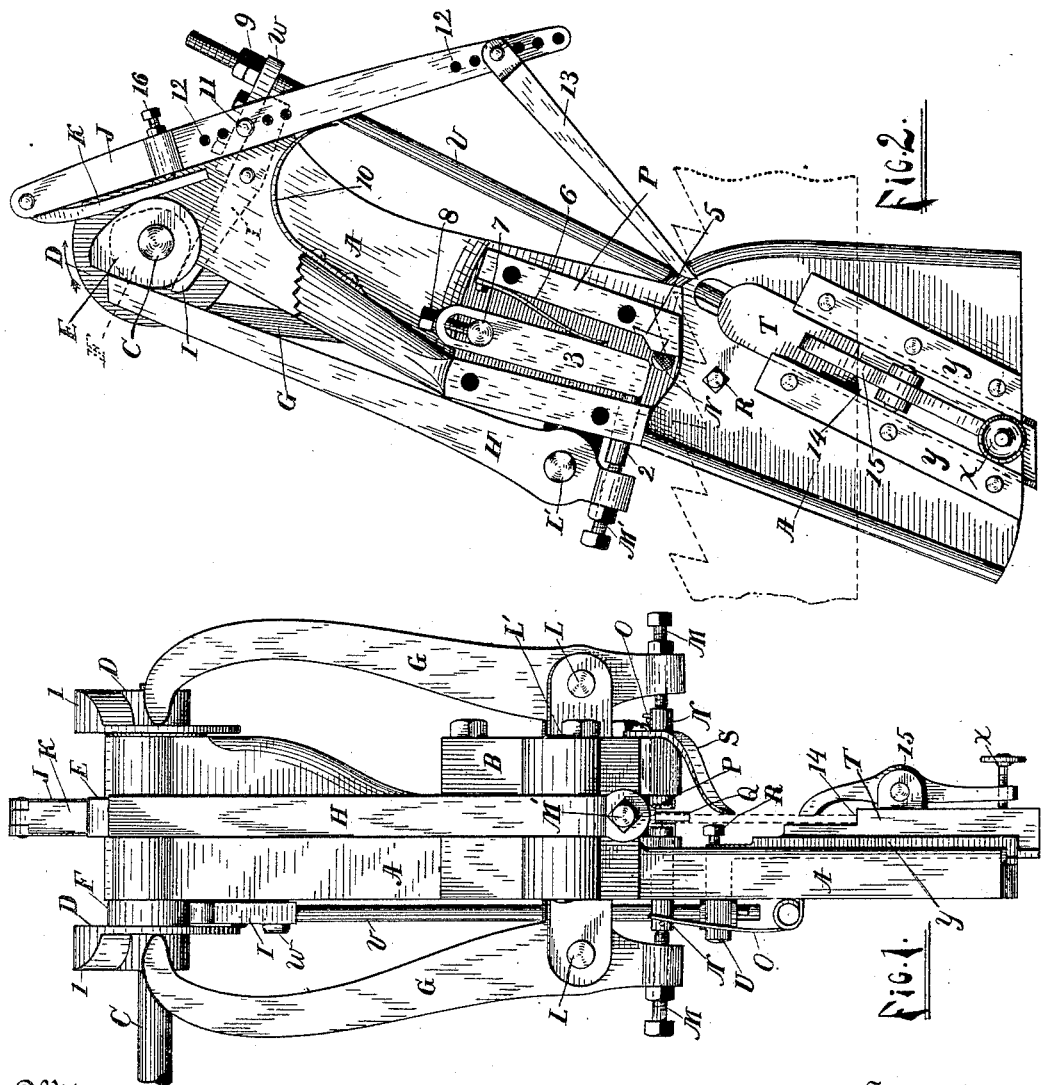
Witnesses
E. J. McGurrin
A. Dodds
Inventor
James B. Rhodes.
By his Attorneys
Moulton & Rogers.

UNITED STATES PATENT OFFICE.

JAMES B. RHODES, OF GRAND RAPIDS, MICHIGAN.

SAW-TOOTH SWAGE.

SPECIFICATION forming part of Letters Patent No. 445,339, dated January 27, 1891.

Application filed February 2, 1889. Serial No. 298,480. (No model.)

*To all whom it may concern:*

Be it known that I, JAMES B. RHODES, a citizen of the United States, residing at Grand Rapids, in the county of Kent and State of Michigan, have invented certain new and useful Improvements in Automatic Saw-Tooth Swages; and I do hereby declare the following to be a full, clear, and exact description of the invention, such as will enable others skilled in the art to which it appertains to make and use the same.

My invention relates to a machine for automatically swaging the teeth of saws, and its object is to automatically shift the saw in the machine and swage each tooth in succession; and it consists in the construction and arrangement of the various devices and parts herein described, and more particularly pointed out in the claims, reference being had to the accompanying drawings, in which similar letters of reference and numerals indicate corresponding parts in both the figures.

Figure 1 is a side elevation. Fig. 2 is a front elevation with a portion removed to show the arrangement of various parts.

A is the frame of the machine, and is adapted for securing to any convenient post or bench.

B is a cap, secured to A, and covers the swaging mechanism. The driving-shaft C, having the cams D D, E, and F, is journaled in the top of A. Cams D D have full parts 1 1 upon their outside faces, forming inclined spiral ways or tracks, which are engaged by the inwardly-turned ends of the gripping-levers G G. E operates the feed-lever J and die-lever H. F operates the lifting-lever I, which is pivoted to A and has adjustably-extensible arm W, and supports the lifting-rod V.

J is the feed-lever, and has adjustable arm K, adjusted by screw 16, pivoted to its top for regulating the throw of the feeding-pawl 13, adjusting holes 12, and retracting spring 10, for retracting the pawl after each forward throw. Gripping-levers G G have pivot-pins L and set-screws M M, and actuate the gripping-pins N N, which are provided with retracting-springs O O. The lifting-rod V has adjusting-nut 9, and is connected to lifting-slide T by the lug U, to which it is attached. Lifting-slide T has the shoulder 14 for supporting the back of the saw, and moves between the guides Y Y, which are secured inclined to the plane of the face of the anvil for conducting the slide obliquely toward the face of the anvil and causing the tooth to be swaged to rest firmly thereon, and is provided with clamp 15, having set-screw X. The die 3 is pivoted to A by pin 7, and has adjusting-screw 8 and lifting-spring 6, and is adapted to strike upon the face of the anvil 5 when driven by swage-pin 2, operated by swage-lever H, having adjusting-screw $m'$ and operated by cam E. The anvil 5 is detachably secured to anvil-bar P, which is rigidly secured between cap B and frame A. Adjusting-screw R and spring S form a guide for steadying the saw in proper position for swaging.

The machine operates substantially as follows: The saw is placed upon the lifting-slide, the back resting upon the shoulder, and between set-screw R and spring S the clamp is adjusted so as to leave the saw free to move longitudinally. The cams are so adjusted upon the shaft that as it revolves cam E is the first to operate, and strikes the feeding-lever J, throwing the top backward and actuating pawl 13, which engages the bottom of the tooth to be swaged and throws the saw forward. The distance the saw is to be thrown is gaged by the adjustment of the arm K by means of adjusting-screw 16; but it should be sufficient to place the tooth a suitable distance in front of the anvil to admit of the oblique movement of the slide carrying the tooth backward to, and causing it to press firmly upon, the face of the anvil. Further revolution of the shaft brings the lifting mechanism into action. Cam F strikes lever I, lifts the rod V and slide T, thus placing the tooth upon the face of the anvil in position for swaging. Further revolution actuates the gripping mechanism. Cams D D, having the full parts 1, strike the gripping-levers with sudden force, operating the gripping-pins, bringing them together upon, and grasping the sides of, the tooth firmly. As soon as the tooth is firmly in the jaws of the gripping mechanism the full part of cam E strikes swage-lever H, operating the swage-pin 2, which strikes the free end of the pivoted die 3 and brings it firmly down upon the point of the tooth, swaging it. As soon as the full part of E is removed from feed-lever I, retracting-spring 10 throws the lever back and the pawl engages the next tooth. The other cams hold their several parts in their proper positions till the swaging is complete, and further revolution of the shaft releases the gripping, the lifting, and the swaging levers, the slide falls to the first position, and the operation proceeds as before till all of the teeth are swaged.

What I claim is—

1. In a device of the class described, the combination, with a suitable supporting-frame, of a shaft journaled in said frame, provided with cams having their outside faces provided with full parts forming inclined spiral ways or tracks, gripping-levers pivoted to the frame, having their upper ends inwardly turned and engaging said ways on the faces of said cams and their lower ends provided with set-screws, gripping-pins movable in said frame toward and away from the saw-tooth and having their outer ends engaging said set-screws, an anvil and rear pivoted die adapted to engage the point of the saw-tooth for swaging, and a lever adapted to operate said die, pivoted to said frame and having its upper end engaging with a cam on said shaft for actuating the same, substantially as set forth.

2. In a device of the class described, the combination, with a suitable supporting-frame, of a shaft journaled in said frame, provided with a cam E, a rear pivoted die 3, and an anvil upon which the point of the saw-tooth rests during the operation of swaging, means for placing the saw-tooth on the anvil and holding it securely during the operation, a longitudinally-movable pin 2, and a lever H, pivoted to the frame and engaging the cam E at its upper end and the pin 2 at its lower end, whereby the revolution of the shaft C upon its axis causes the die 3 to strike upon the point of the saw-tooth, substantially as set forth.

3. In a device of the class described, the combination of a suitable frame, a die pivoted thereto, an anvil engaging the point of the die, a guide adapted to support a saw movable on said frame toward and away from said anvil, a lever and rod connecting said slide with a cam upon a shaft journaled in said frame, whereby the revolution of the shaft upon its axis will cause the saw to approach and recede from said anvil, gripping-levers pivoted to the frame and operated by cams on said shaft, and gripping-pins actuated by the levers for holding the saw-teeth, and a swage-pin engaging the die and operated by a pivoted lever engaging with a cam on said shaft, substantially as set forth.

4. In a device of the class described, the combination, with a suitable supporting-frame, of a shaft journaled in said frame, provided with cams having their outer faces provided with full parts forming inclined spiral ways or tracks, gripping-levers pivoted to the frame, having their upper ends engaging said ways on the faces of said cams, and their lower ends provided with set-screws, gripping-pins longitudinally movable in said frame toward and away from the saw-tooth, and having their outer ends engaging said set-screws, a rear pivoted die 3, and an anvil upon which the point of the saw-tooth rests during the operation of swaging, a guide movable on said frame for placing the saw-tooth on the anvil in proper position for swaging, a longitudinally-movable pin 2, and a pivoted lever H, engaging the pin 2 at its lower end and a cam E on the shaft at its upper end for actuating the die 3, substantially as and for the purposes set forth.

5. In a device of the class described, the combination, with a suitable supporting-frame, of a shaft journaled in said frame, provided with cams having faces provided with full parts forming inclined spiral ways, gripping-levers pivoted to the frame, having their upper ends inwardly turned and engaging said cams and their lower ends engaging with suitable longitudinally-movable gripping-pins for holding a saw-tooth, a rear pivoted die 3, and an anvil upon which the point of the saw-tooth rests during the operation of swaging, a guide adapted to support a saw movable in said frame toward and away from the anvil, a pawl adapted to engage a saw-tooth pivoted to a lever pivoted to the frame, a cam on the shaft engaging with the said pawl-lever for actuating the same, whereby the saw may be longitudinally moved in its seat on said guide, a longitudinally-movable pin adapted to engage the die, and a lever for operating the pin, arranged substantially as set forth.

6. In a device of the class described, and in combination with a suitable frame, a revoluble shaft C, journaled in the frame and having cams D D, E, and F arranged thereon, as set forth, a spring-operated rear-pivoted die 3 and an anvil 5, arranged as described, a longitudinally-movable guide T, provided with a shoulder adapted to engage the back of a saw-rod V, and lever I, engaging with the cam F for operating the guide-pawl 13, and lever J, having the arm K, engaging the cam E, for shifting the saw on the guide, as set forth, transversely-arranged longitudinally-movable gripping-pins N N, adapted to engage the saw-tooth, levers and cams, arranged as described, for operating the same, and the swage-pin, and its driving mechanism, arranged substantially as described, and for the purposes set forth.

7. In a device of the class described, the combination, with a suitable supporting-frame, of a shaft journaled in said frame, cams secured thereon, a pivoted swaging-die and anvil secured thereto, a guide adapted to carry the saw to and away from the anvil, a shifting device adapted to move the saw longitudinally on the guide, gripping devices operated by mechanism connected to the shaft, and means for operating the swage, substantially as set forth.

8. In a device of the class described, and in combination with a suitable supporting-frame, a revoluble shaft journaled in said frame, cams secured thereon, levers engaging said cams, a rear-pivoted spring-actuated die and anvil secured to the frame, a guide for carrying the saw, a pawl for moving the same longitudinally, gripping-pins for engaging the sides of the saw-teeth, and a swage-pin for operating the die, said guide, pawl, and gripping and swaging pins being actuated by said levers engaging said cams, substantially as set forth.

In testimony whereof I affix my signature in presence of two witnesses.

JAMES B. RHODES.

Witnesses:
DENNIS L. ROGERS,
LUTHER V. MOULTON.